United States Patent
Liu et al.

(10) Patent No.: US 12,368,333 B2
(45) Date of Patent: Jul. 22, 2025

(54) ROTOR, INTERIOR PERMANENT MAGNET MOTOR, AND COMPRESSOR

(71) Applicant: Danfoss (Tianjin) Ltd., Tianjin (CN)

(72) Inventors: Wanzhen Liu, Tianjin (CN); Yan Lin, Tianjin (CN); Guangqiang Liu, Tianjin (CN); Zhenyu Wang, Tianjin (CN); Meng Wang, Tianjin (CN); Shizhong Ji, Tianjin (CN); Li Yao, Tianjin (CN)

(73) Assignee: DANFOSS (TIANJIN) LTD., Tianjin (CN)

( * ) Notice: Subject to any disclaimer, the term of this patent is extended or adjusted under 35 U.S.C. 154(b) by 403 days.

(21) Appl. No.: 17/907,818

(22) PCT Filed: Feb. 23, 2021

(86) PCT No.: PCT/CN2021/077479
§ 371 (c)(1),
(2) Date: Aug. 29, 2022

(87) PCT Pub. No.: WO2021/169956
PCT Pub. Date: Sep. 2, 2021

(65) Prior Publication Data
US 2023/0119389 A1     Apr. 20, 2023

(30) Foreign Application Priority Data

Feb. 28, 2020   (CN) .......................... 202020231420.1

(51) Int. Cl.
*H02K 1/276*   (2022.01)
*F25B 31/02*   (2006.01)
(Continued)

(52) U.S. Cl.
CPC ........... *H02K 1/276* (2013.01); *F25B 31/026* (2013.01); *H02K 21/14* (2013.01); *H02K 21/16* (2013.01); *H02K 2201/03* (2013.01)

(58) Field of Classification Search
CPC ........ H02K 1/276; H02K 21/14; H02K 21/16; H02K 2201/03; F25B 31/026
See application file for complete search history.

(56) References Cited

U.S. PATENT DOCUMENTS

| | | | |
|---|---|---|---|
| 2004/0080228 A1* | 4/2004 | Ahn .................... | H02K 1/2766 310/156.56 |
| 2007/0126304 A1* | 6/2007 | Ito ......................... | H02K 1/28 310/156.53 |

(Continued)

FOREIGN PATENT DOCUMENTS

| CN | 1288281 A | * | 3/2001 |
|---|---|---|---|
| CN | 1976171 B | | 8/2010 |

(Continued)

OTHER PUBLICATIONS

International Search Report mailed on May 26, 2021, in connection with corresponding International Application No. PCT/CN2021/077479 (5 pp., including machine-generated English translation).

*Primary Examiner* — Jue Zhang
(74) *Attorney, Agent, or Firm* — McCormick, Paulding & Huber PLLC

(57) ABSTRACT

A rotor for an interior permanent magnet motor, an interior permanent magnet motor, and a compressor includes a rotor core, a plurality of U-shaped permanent magnet accommodating grooves, a plurality of first air grooves, and a plurality of first recesses, wherein the plurality of U-shaped permanent magnet accommodating grooves are arranged inside the rotor core at intervals; the plurality of first air grooves are provided outside the ends of the U-shaped permanent magnet accommodating grooves; and each first air groove is located on an extension line of the end of the corresponding U-shaped permanent magnet accommodating groove and is close to the outer contour of the rotor so as to form a plurality of first magnetic isolation bridges. Each first recess (Continued)

is recessed from the outer contour of the rotor towards the center of the rotor, starts from the end of the corresponding first magnetic isolation bridge at the outermost side of the rotor, and at most, extends to the first intersection point of the connecting line between the bottom center of the U-shaped permanent magnet accommodating groove and the center of the rotor, and the outer contour of the rotor, such that the air gap magnetic density generated between the outer contour of the rotor and the inner contour of a stator of the interior permanent magnet motor approaches a sine curve.

19 Claims, 11 Drawing Sheets

(51) Int. Cl.
    *H02K 21/14*      (2006.01)
    *H02K 21/16*      (2006.01)

(56) References Cited

U.S. PATENT DOCUMENTS

2012/0038236 A1    2/2012    Tajima et al.
2017/0294813 A1*  10/2017    Lim ..................... H02K 3/325

FOREIGN PATENT DOCUMENTS

| | | | |
|---|---|---|---|
| CN | 103166350 A | | 6/2013 |
| CN | 204271863 U | | 4/2015 |
| CN | 104300710 B | * | 9/2018 |
| CN | 211908484 U | * | 11/2020 |
| CN | 212486356 U | | 2/2021 |
| JP | 63110944 A | * | 5/1988 |
| JP | 2004135380 A | * | 4/2004 |
| WO | 2019179864 A1 | | 9/2019 |

\* cited by examiner

Fig. 7A                    Fig. 7B

ROTOR, INTERIOR PERMANENT MAGNET MOTOR, AND COMPRESSOR

CROSS-REFERENCE TO RELATED APPLICATIONS

This application is a National Stage application of International Patent Application No. PCT/CN2021/077479, filed on Feb. 23, 2021, which claims priority to Chinese Patent Application No. 202020231420.1, filed on Feb. 28, 2020, each of which is hereby incorporated by reference in its entirety.

TECHNICAL FIELD

The present invention relates to the field of permanent magnet motors, and more specifically to a rotor of an interior permanent magnet rotor, an interior permanent magnet motor using the rotor, and a compressor using the motor.

BACKGROUND

Usually, permanent magnet motors, such as brushless DC motors, have permanent magnets mounted on a rotor core to generate the rotational driving force. Depending on how the permanent magnets are mounted on the rotor core, permanent magnet motors are divided into surface-mounted permanent magnet motors and built-in permanent magnet motors.

Typically, an interior permanent magnet motor has a plurality of permanent magnets mounted in the rotor core. A built-in permanent magnet motor includes a stator, coils wound around the stator, and a rotor, wherein, the rotor is rotatably arranged in the stator.

Currently, the harmonic distortion rate of motor back EMF is one of the problems that needs to be solved urgently. Improving the harmonic distortion rate of motor back EMF can reduce the noise of the motor and improve the mechanical strength of the rotor. Usually, uneven air gaps or rotor segmented slanted poles are used to improve the harmonic distortion rate of motor back EMF.

The use of rotor segmented slopping poles will increase the complexity of rotor manufacturing, and the segmented slanted poles will cause the rotor to generate axial inter-pole flux leakage, thereby reducing the output torque of the motor or requiring a larger current.

SUMMARY

The present invention is intended to solve at least one aspect of the above-mentioned problems and defects in the prior art.

Accordingly, one of the purposes of the present invention is to provide a rotor of an interior permanent magnet motor capable of realizing uneven air gaps.

Another purpose of the present invention is to provide an interior permanent magnet motor using the above-mentioned rotor.

Yet another purpose of the present invention is to provide a compressor using the above-mentioned built-in permanent magnet motor.

According to one aspect of the present invention, a rotor of an interior permanent magnet motor is provided, comprising:

A rotor iron core;

A plurality of U-shaped permanent-magnet accommodating grooves, arranged at intervals inside the rotor iron core;

A plurality of first air slots, arranged on the outside of an end of the U-shaped permanent-magnet accommodating grooves, each of the first air slots being located on an extension line of the end of the corresponding U-shaped permanent-magnet accommodating groove and being close to the outer contour of the rotor to form a plurality of first magnetic isolation bridges; and A plurality of first recesses, each of the first recesses being receded from the outer contour of the rotor toward the center of the rotor, starting from the end of the outermost corresponding first magnetic isolation bridge of the rotor and extending at most to a first point of intersection where a connecting line between the bottom center of the U-shaped permanent-magnet accommodating groove and the rotor center intersects with the outer contour of the rotor, such that the air gap flux density generated between the outer contour of the rotor and the inner contour of the stator of the interior permanent magnet motor is close to a sine curve.

According to another aspect of the present invention, an interior permanent magnet motor is provided, the interior permanent magnet motor comprising:

A stator, the stator comprising a cylindrical stator iron core, a plurality of stator teeth extending inwardly in a stator radial direction, stator slots distributed among the plurality of stator teeth, and coils winding around the stator teeth to generate a rotating magnetic field; and The above-mentioned rotor, which is rotatably disposed in the stator and is spaced apart from the stator.

According to yet another aspect of the present invention, a compressor is provided using the above-mentioned built-in permanent magnet motor, wherein the working voltage of the compressor is a voltage smaller than or equal to 600 V.

BRIEF DESCRIPTION OF THE DRAWINGS

Now, by referring to the accompanying schematic figures and by illustration only, embodiments of the present invention are described, wherein corresponding reference numerals indicate corresponding parts in the drawings.

FIG. 7A and FIG. 7B are a side view and a cross-sectional view, respectively, of a rotor iron core provided with a rotor cover.

DETAILED DESCRIPTION

Figure 1:
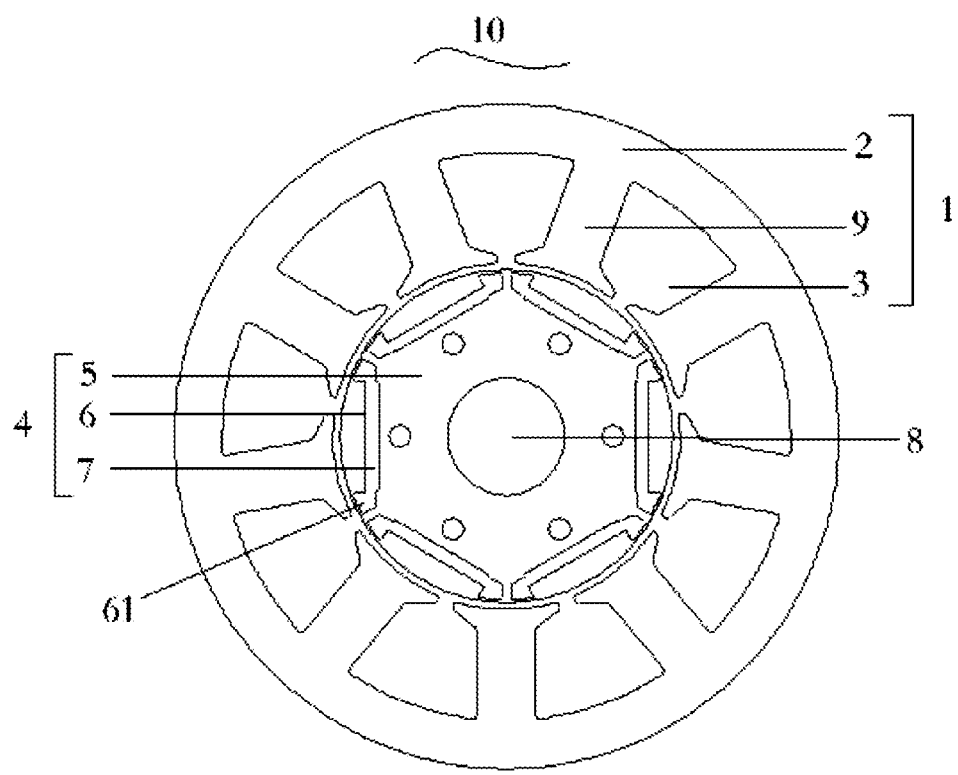
FIG. 1 is a schematic cross-sectional view of an interior permanent magnet motor having a circular rotor in the prior art.

The technical solutions of the present invention will be further described below through embodiments in conjunction with the accompanying FIGS. 1-7C. In the description, identical or similar reference numerals in the drawings indicate identical or similar components. The following explanation of embodiments of the present invention with reference to the accompanying drawings is intended to explain the overall inventive concept of the present invention, and should not be interpreted as a limitation of the present invention.

The built-in permanent magnet motors according to the embodiments of the present invention will be described below by referring to the accompanying drawings.

FIG. 1 shows a cross-sectional view of a conventional built-in permanent magnet motor 10. The built-in permanent magnet motor 10 includes a stator 1, coils (not shown in FIG. 1) wound around the stator 1, and a rotor 4, which is rotatably arranged in the stator 1.

The stator 1 includes a cylindrical stator iron core 2 formed by stacking a plurality of silicon steel sheets; stator teeth 9 formed in the stator iron core 2 and extending inwardly in stator radial directions, stator slots 3 distributed between the plurality of stator teeth; and coils (not shown) wound around the stator teeth 9.

The rotor 4 includes a rotor iron core 5 formed by stacking a plurality of silicon steel sheets, the rotor iron core 5 being arranged in a cylindrical cavity of the stator 1, and being spaced apart from the cylindrical cavity of the stator 1 by a predetermined distance; a plurality of permanent magnet slots 6 formed in the rotor iron core 5; and a plurality of permanent magnets 7, the permanent magnets 7 being inserted into the permanent magnet slots 6, respectively. Usually, after the permanent magnets 7 are inserted into the permanent magnet slots 6, permanent magnet slot gaps 61 are formed at the ends of the permanent magnets 7. A rotating shaft 8 is inserted into a cylindrical cavity formed in the center of the rotor 4 and thus rotates together with the rotor iron core 5.

When an electric current is supplied to the coils wound around the stator teeth 9 of the conventional permanent magnet motor 10 having the above-mentioned structure, the polarities of the coils are sequentially changed, a rotating magnetic field is generated between the stator 1 and the rotor 4, and the magnetic field of the rotor 4 rotates, following the rotating magnetic field, and generates a rotational driving force. As a result, the rotor iron core 5 is caused to rotate along with the rotating shaft 8.

In the interior permanent magnet motor 10, since the length of the gap between the inner contour of the stator 1 and the outer contour of the rotor 4 is uniform, the permanent magnets 7 built into the rotor 4 usually produce a non-sinusoidal air gap flux density in this gap, which will increase the torque fluctuations for the permanent magnet motor being powered by a sinusoidal electric current. As a result, vibration will occur when the rotor 4 rotates, increasing the noise. As a result, the performance of the interior permanent magnet motor 10 is lowered.

Figure 2:
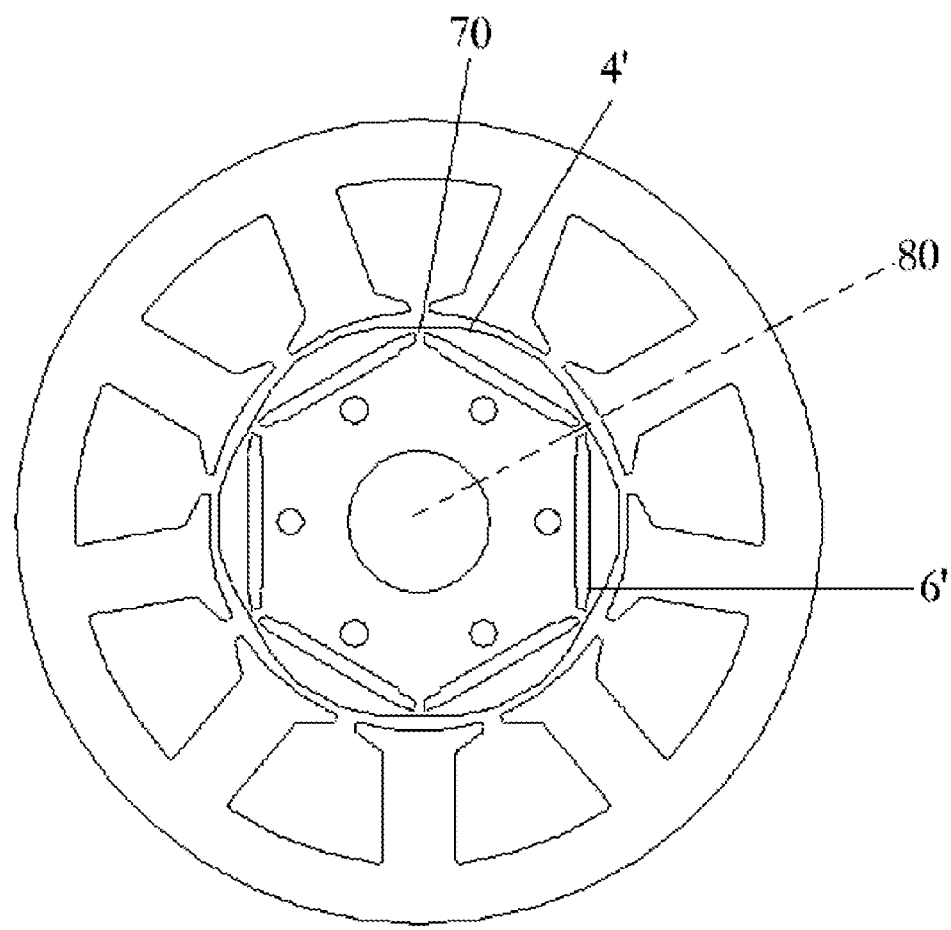
FIG. 2 is a schematic cross-sectional view of an interior permanent magnet motor having a non-circular rotor in the prior art.

In the prior art, to generate a sinusoidal air gap magnetic field, as shown in FIG. 2, the rotor 4' usually has an irregular circular shape to obtain an uneven air gap between the inner contour of the stator and the outer contour of the rotor. In FIG. 2, in addition to the outer contour of the rotor being an irregular circular shape, the shape of the permanent magnet slots 6' is also modified accordingly. This will make it difficult to ensure that the stator and the rotor are concentric during the assembly process of the permanent magnet motor.

The rotor shown in FIG. 1 has a circular shape, and the rotor shown in FIG. 2 has an irregular circular shape. In the rotor shown in FIG. 1 or FIG. 2, the space between two poles (i.e., two adjacent permanent magnets) corresponds to the maximum air gap. However, as known to those skilled in the art, since the space 70 between the poles corresponds to the maximum air gap, at the center of the rotor 24, the inductance of the Q axis 80 perpendicular to the direction of the rotor magnetic field becomes smaller, reducing the maximum torque.

Figure 3A:
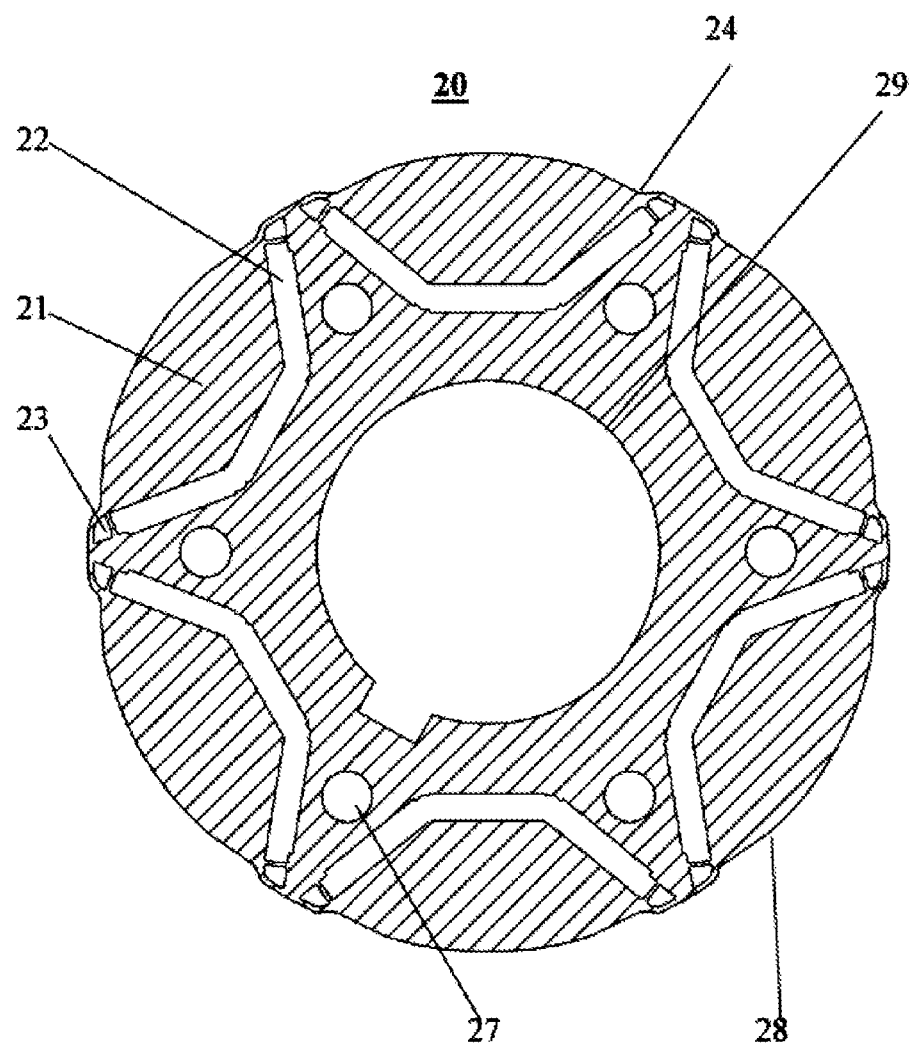
FIG. 3A is a schematic cross-sectional view of a rotor of an interior permanent magnet motor according to an embodiment of the present invention.

Referring to FIG. 3A, the rotor 20 is used in place of the rotor 4 or 4' shown in FIG. 1 or FIG. 2 according to one embodiment of the present invention. The structure of the rotor 20 will be described in detail here, and for the description of other components, please refer to the above discussion.

As seen in FIG. 3A, the rotor 20 includes a rotor iron core 21, a plurality of U-shaped permanent-magnet accommodating grooves 22, a plurality of first air slots 23, and a plurality of first recesses 24. The plurality of U-shaped permanent-magnet accommodating grooves 22 are arranged inside the rotor iron core 21 at intervals, and for example, they are distributed around the outer contour 28 or the outer circumference 28 of the rotor 20 at equal intervals.

In the embodiment of the present invention, the rotor 20 is a regular cylindrical shape, so the rotor 20 has a circular outer contour 28. The outer contour 28 of the rotor 20 and the inner contour of the stator are spaced apart from each other by a constant distance or gap. In addition, the rotor 24 also includes a rotating shaft provided at its center. In other words, the rotating shaft is arranged in the cylindrical cavity of the cylindrical rotor iron core 21. The inner contour 29 of the rotor iron core 21 is closely fitted to the rotating shaft, and couples with shaft key holes (not shown) of the rotor iron core 21 through shaft keys (not shown) on the rotating shaft. Usually, the rotor iron core 21 having a cylindrical shape is manufactured by stacking a plurality of silicon steel sheets. It can be understood that the cylindrical rotor iron core 21 and the cylindrical rotating shaft are joined together by shaft keys and shaft key holes (not shown) and constitute the cylindrical rotor 20.

As shown in FIG. 3A, in the present invention, the rotor stacks can be fixed by six rivets or bolts 27 to form the rotor iron core 21 of the rotor 20, thereby forming the rotor 20. It should be noted that those skilled in the art can understand that the connection between the rotor 20 and the rotating shaft can be achieved by means of heated coupling, hot press and cold press in addition to the shaft key means, and when a heated coupling, hot press or cold press means is used, the shape of the bore of the rotor can be changed accordingly, such as using a non-circular rotor bore.

Each of the first air slots 23 is provided on the outside of the end of the U-shaped permanent-magnet accommodating groove 22. Specifically, each of the first air slots 23 is located on the extension line of the end of the corresponding U-shaped permanent-magnet accommodating groove 22, and is closer to the outer contour of the rotor 20, thereby forming a plurality of first magnetic isolation bridges 25, with reference to FIG. 3B. It should be noted that by saying that each of the first air slots 23 is located on the extension line of the end of the corresponding U-shaped permanent-magnet accommodating groove 22, it means that each of the first air slots 23 is located within or partially coincident with an area defined by the extension lines on both sides of the end of the corresponding U-shaped permanent-magnet accommodating groove 22.

The first air slot 23 is specifically set as an irregular or regular polygonal permanent magnet slot gap. Of course, it can be understood that the first air slots 23 can also be set to be regular triangles or rectangles in shape as required.

Figure 3B:
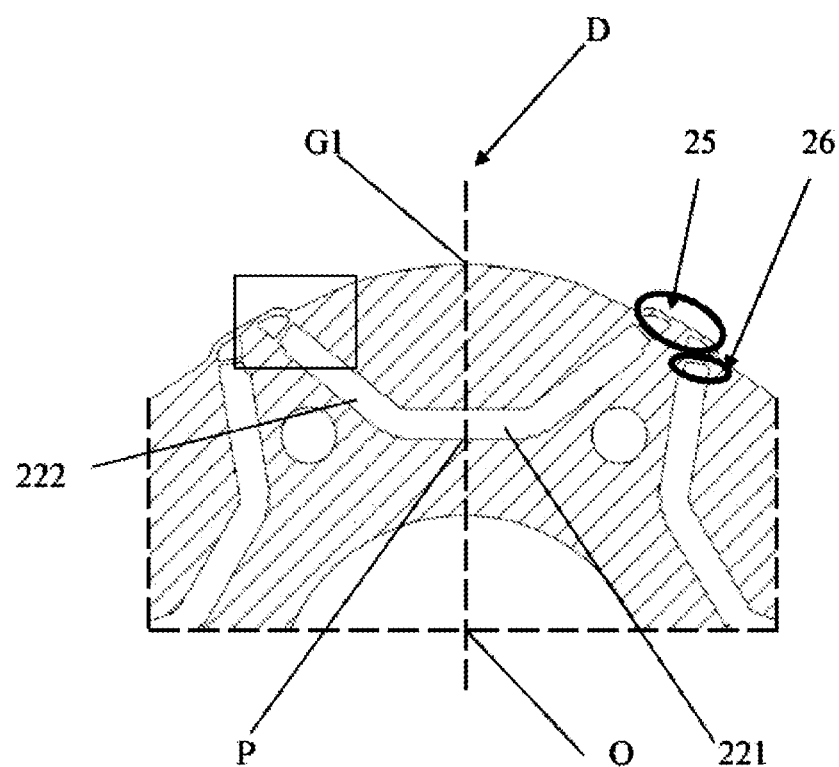
FIG. 3B is a schematic view showing a part of the cross-section of the rotor shown in FIG. 3A.

Referring to FIG. 3B, each of the first recesses 24 is receded from the outer contour of the rotor 20 to the center of the rotor, starting from the end of the outermost corresponding first magnetic isolation bridge 25 of the rotor 20 and extending at most to a first point of intersection G1 where a connection line D (or the central axis) between the bottom center P of the U-shaped permanent-magnet accommodating groove 22 and the rotor center O intersects with the outer contour 28 of the rotor 20, such that the air gap flux density generated between the outer contour 28 of the rotor 20 and the inner contour of the stator of the interior permanent magnet motor is close to a sine curve.

Figure 3C:
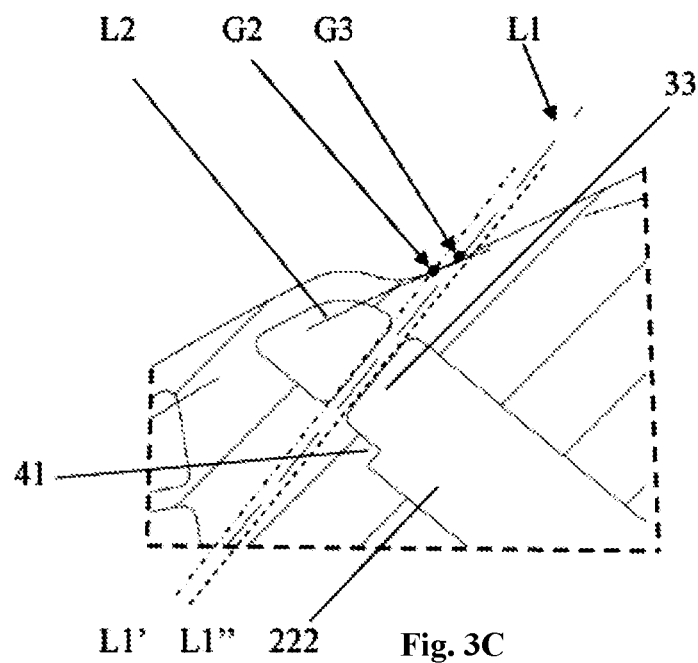
FIG. 3C is an enlarged schematic view of the parts enclosed in the circles O of FIG. 3B.

Referring to both FIG. 3B and FIG. 3C, a second magnetic isolation bridge 26 is formed between each of the first air slots 23 and the corresponding end of each of the U-shaped permanent-magnet accommodating grooves 22, extension lines L1' and L1" on both sides of the second magnetic isolation bridge 26 respectively intersect with the outer contour of the rotor 20 to form two points of intersection (not shown), and the lowest point G2 of the first recess 24 corresponding to the second magnetic isolation bridge 26 is located between the two points of intersection or coincident with one of the two points of intersection. FIG. 3C shows that this lowest point G2 coincides with the point of intersection where the extension line L1' intersects with the outer contour.

Referring to FIG. 3C, the point of intersection G3 where the extension line L1 of the center line of the corresponding second magnetic isolation bridge 26 intersects with the outer contour of the rotor 20 is closer to the central axis D passing through the first point of intersection G1 than the lowest point G2 of the corresponding first recess. The line L2 is a circle whose center is at the rotor center point O and is tangent to the first recess 24 at the lowest point G2.

Figure 4A:
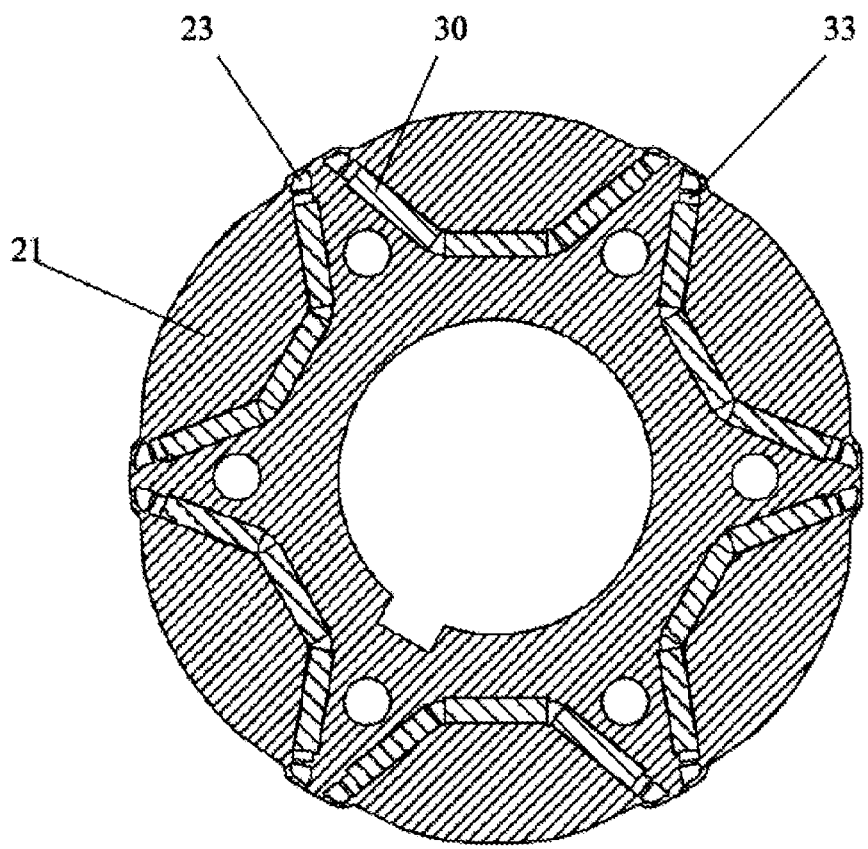
FIG. 4A is a schematic cross-sectional view of the rotor shown in FIG. 3A after the permanent magnets are installed.

Referring to FIG. 4A and FIG. 3B, the rotor 20 further includes a plurality of groups of permanent magnets 30 in it, each group of permanent magnets 30 is accommodated in a corresponding U-shaped permanent-magnet accommodating groove 22, and each of the U-shaped permanent magnet accommodating grooves 22 includes a transverse extension groove 221 and two vertical extension grooves 222 communicating with the transverse extension groove.

The plurality of groups of permanent magnets may be 6 groups, and each of the U-shaped permanent-magnet accommodating grooves 22 is provided with at least one group of permanent magnets or a plurality of groups of permanent magnets. Each group consists of 3n permanent magnets, where n is the number of blocks divided in the axial direction, and n is an integer greater than or equal to 1 and less than or equal to 8

Specifically, in the example shown in FIG. 4A, each of the U-shaped permanent-magnet accommodating grooves 22 is provided with 1 group of permanent magnets, each group of permanent magnets is composed of 3 permanent magnets, and each of the permanent magnets is correspondingly arranged inside a transverse extension groove 221 and vertical extension groove 222. However, as known to those skilled in the art, the rotor 20 may be provided with a number of permanent magnets or permanent-magnet accommodating grooves, and a number of permanent magnets included in each group of permanent magnets as required.

Figure 4B:
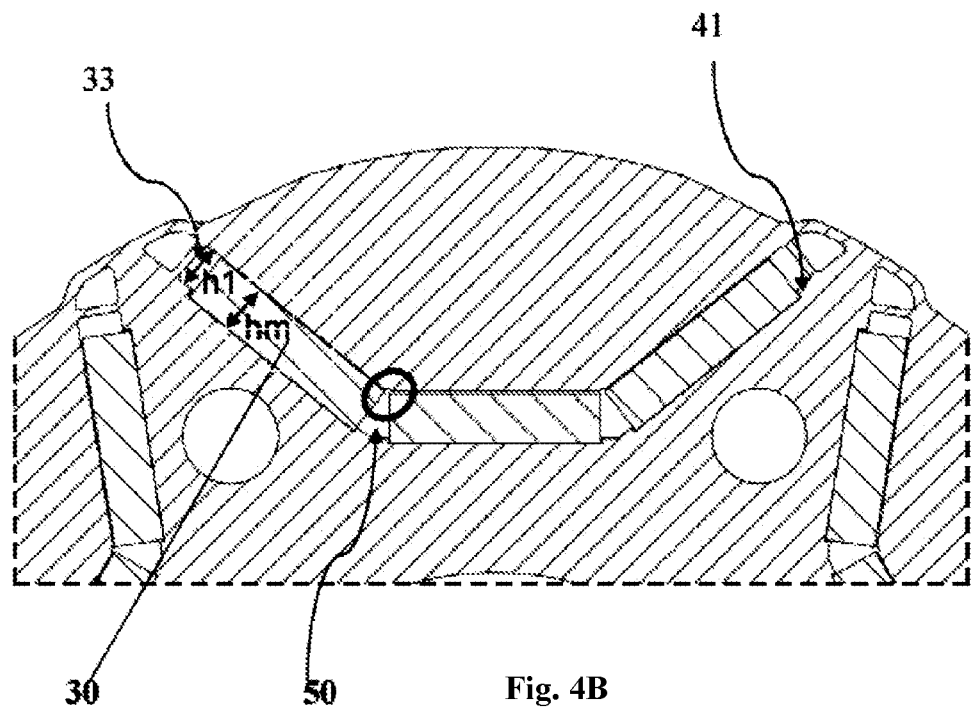
FIG. 4B is a schematic view showing a part of the cross-section of the rotor shown in FIG. 4A.
Figure 4C:
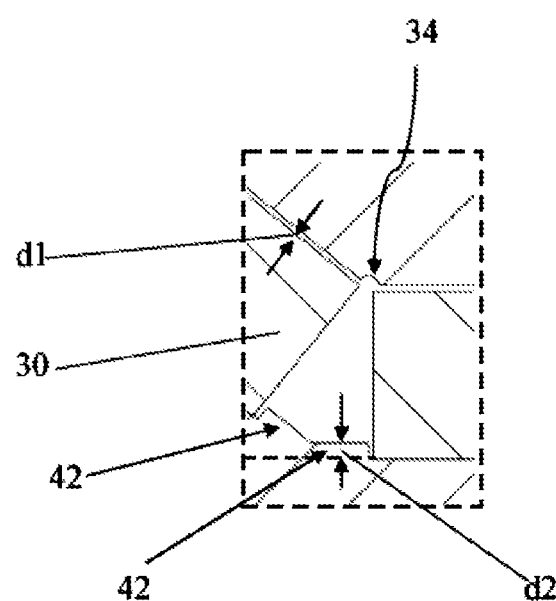
FIG. 4C is an enlarged schematic diagram showing a part of that shown in FIG. 4B.

Referring to FIG. 4B and FIG. 4C, each of the vertical extension grooves 222 is provided with a first protrusion 41 at one end close to the second magnetic isolation bridge 26, and the first protrusion 41 is used to limit the position of the permanent magnet 30 in the U-shaped permanent-magnet accommodating groove 22, so that a second air slot 33 is formed between the second magnetic isolation bridge 26 and the permanent magnet 30, and the second air slot 33 has a dimension h1 in the protruding direction of the first protrusion 41 that is smaller than the dimension hm of the permanent magnet 30 and is greater than or equal to ½ of the dimension hm of the permanent magnet. That is, the width h1 of the second air slot 33 is smaller than the width hm of the permanent magnet 30, so that it allows formation of the first protrusion 41 at the end of the permanent magnet 30 to limit the position of the permanent magnet 30, while ensuring that the width h1 of the second air slot 33 is greater than or equal to ½ of the width hm of the permanent magnet to prevent the increase of the leakage flux of the permanent magnet due to the narrowness of the second air slot 33. As shown in the figure, the cross section of the second air slot 33 is substantially rectangular, and the cross section of the permanent magnet 30 is also substantially rectangular. Of course, it can be understood that the second air slot 33 can also be set to be a regular triangle or rectangle in shape as required.

That is, after the permanent magnets 30 are placed into the U-shaped permanent-magnet accommodating grooves 22 of the rotor 20, the second air slots 33 are formed at the ends of the vertical extension grooves 222, and the permanent magnets 30 rely on the first protrusions 41 for position limiting, and the second magnetic isolation bridges 26 are not used directly to limit the positions of the permanent magnets 30.

Referring to FIG. 4B and FIG. 4C, the junction between each vertical extending slot 222 and lateral extending slot 221 is provided with a cavity portion 50 with a conical cross-section, and two connected second protrusions 42 protruding toward the apex of the cone are arranged on the bottom of the cavity portion 50, and the top of the cavity portion 50 is a circular arc-shaped second recess 34. Since the apex of the cavity portion 50 is formed to become the second recess 34, the apex of the cone is not shown in FIG. 4C, but it can be understood that the apex of the cone refers to the point of intersection of the extension lines of the two sides of the cone.

In the embodiment, the second recess 34 is formed in a circular arc shape, so the radius corresponding to the virtual circle is the radius of the second recess 34. The radius of the second recess 34 is less than or equal to the height of the second protrusion d2 facing the second recess; or The sum of the radius of the second recess 34 and the gap d1 between the permanent magnet 30 and the corresponding U-shaped permanent-magnet accommodating groove 22 is equal to the height d2 of the second protrusion 42 protruding toward the second recess 34.

Thus, the radius of the second recess 34 is set so that it can be ensured that a sufficient air gap blocks the passage of the magnetic field without affecting the local working points of the permanent magnet.

As described above, the air gap between the inner contour of the stator and the outer contour 28 of the rotor 20 is, as a whole, an annular air gap.

Figure 5A:
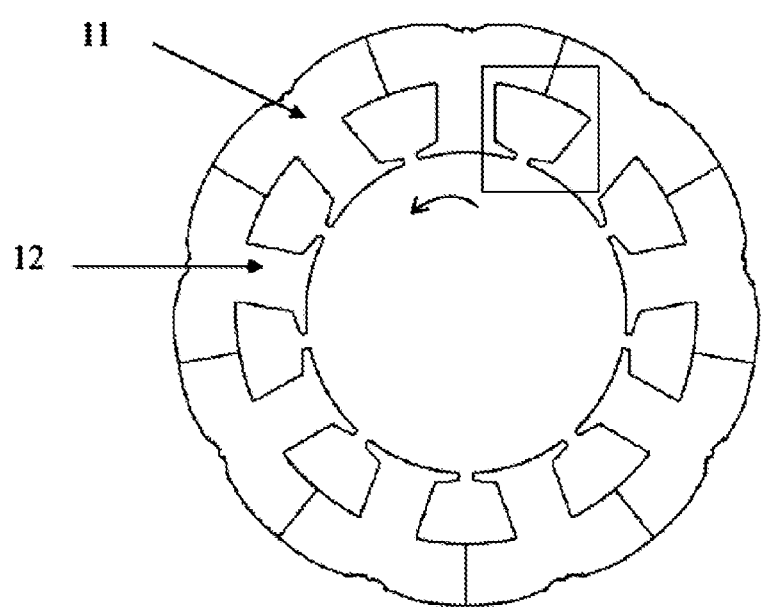
FIG. 5A is a schematic cross-sectional view of a stator according to an embodiment of the present invention.

Referring to FIG. 5A, in an example of the present invention, the stator iron core 11 of the stator is formed by splicing a plurality of I-shaped teeth 12 in the circumferential direction, and the arrow in the figure shows the rotation direction of the rotor.

Figure 5B:
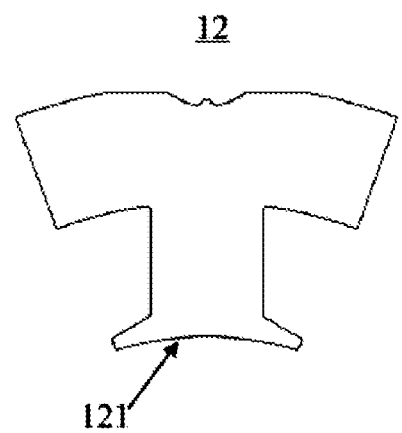
FIG. 5B is a schematic structural view of a single I-shaped tooth shown in FIG. 5A
Figure 5C:
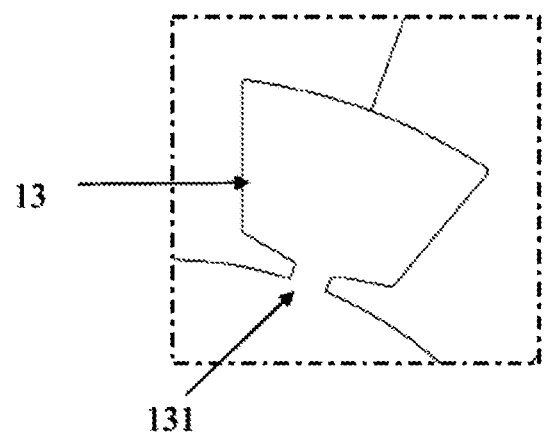
FIG. 5C is the enlarged schematic view showing the structure of the stator slot enclosed in the box of FIG. 5A.

FIG. 5B shows the structure of a single I-shaped tooth 12. The inner edge 121 of the I-shaped tooth 12 is a circular arc segment with the center of the circle being at the center of the stator, and the stator slot 13 formed after splicing is a semi-closed slot with a slot opening 131 greater than or equal to 3.5 mm, as shown in FIG. 5C.

Figure 5D:
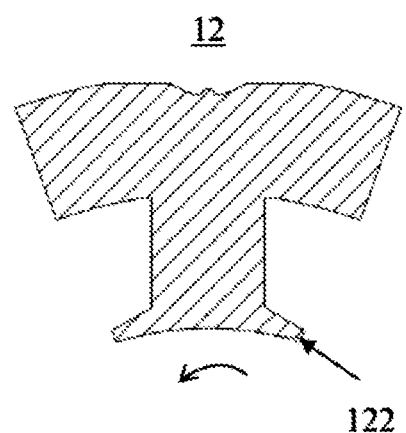
FIG. 5D is a schematic structural view of a modification of the single I-shaped tooth shown in FIG. 5A.

In another example, as shown in FIG. 5D, the tooth tip 122 of the I-shaped tooth 12 that is away from the rotation direction is a chamfered structure. By chamfering the angle of the tooth tip, the electromagnetic radial force on the I-shaped teeth 12 can be reduced to prevent vibrations of the whole I-shaped tooth caused by local vibrations of the tooth tip 122, thereby preventing vibration displacements generated between the I-shaped teeth. The arrow in the figure shows the direction of rotation of the rotor.

Figure 5E:
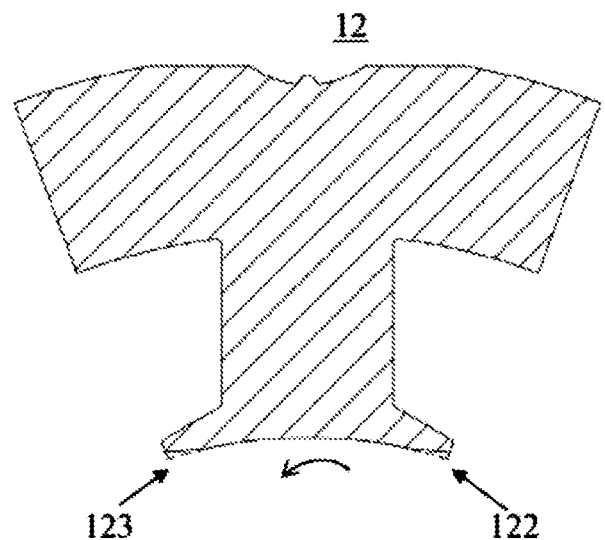
FIG. 5E is a schematic structural view of another modification of the single I-shaped tooth shown in FIG. 5A.

Referring to FIG. 5E, the tooth tip 123 of the I-shaped tooth 12 on the forward side of the rotor rotation direction is a chamfered structure. In addition, it can be seen that the tooth tip 122 can optionally be a chamfered structure. The arrow in the figure shows the direction of rotation of the rotor. Here, the tooth tip on the forward side refers to the tooth tip 123 that is in the same direction as the rotation direction of the rotor but is located in the forward direction of rotor rotation relative to the other 122 of the two tooth tips of the I-shaped tooth 12. Having a chamfered structure, the tooth tip on the forward side can be used to balance the magnetic resistance distribution of the tooth top, so that the magnetic resistances at the tooth tips on both sides of the tooth top are approximately the same.

Figure 5F:
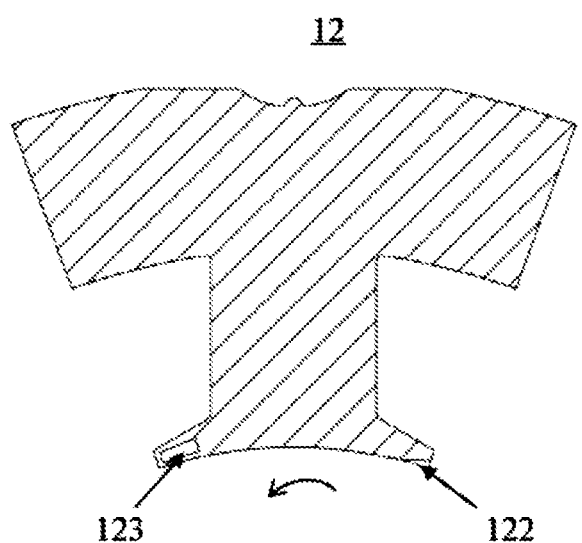
FIG. 5F is a schematic structural view of another modification of the single I-shaped tooth shown in FIG. 5A.

Referring to FIG. 5F, the tooth tip 123 of the I-shaped tooth 12 on the forward side in the rotation direction of the rotor is an open hole structure. In addition, it can be seen that the tooth tip 122 can optionally be a chamfered structure. The arrow in the figure shows the direction of rotation of the rotor. Having a chamfered structure, the tooth tip on the forward side can also be used to balance the magnetic resistance distribution of the tooth top, so that the magnetic resistances at the tooth tips on both sides of the tooth top are approximately the same.

In the above detailed description, the designs of the main components such as the stator and the rotor 20 of the interior permanent magnet motor are mainly described, and it can be understood that the interior permanent magnet motor may also comprise a casing (not shown) that includes the stator and the rotor 20, as well as a motor base and other accessories that usually come with the motor. Here, the casing or the connection structures between the casing and the stator, etc., will not be further described in detail, so as not to obscure the main inventive aspects of the present invention.

Figure 6A:
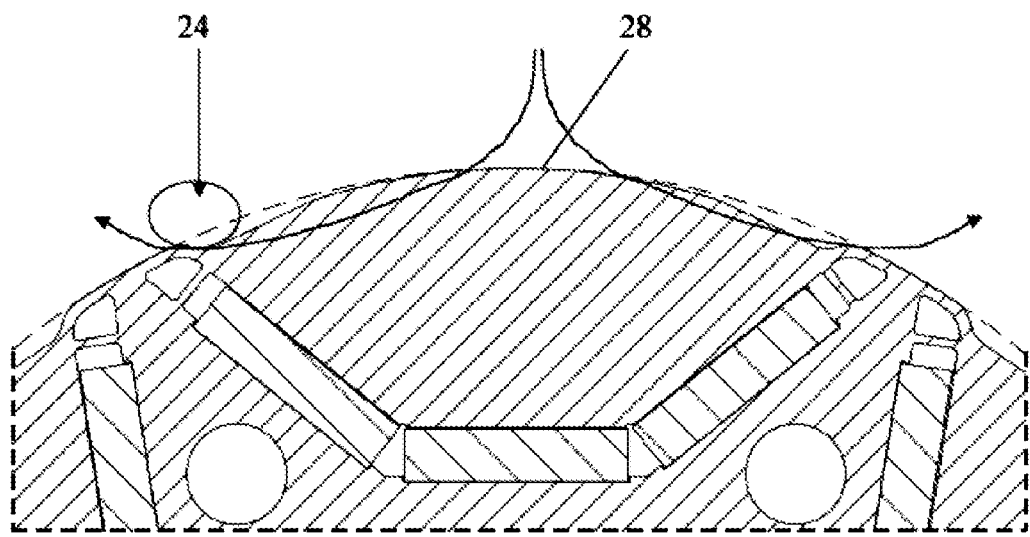
FIG. 6A and FIG. 6B are respectively a schematic view of the stator magnetic field lines passing through the rotor in the case where the first recesses are not provided, and a schematic view of the stator magnetic field lines passing through the rotor in the case where the first recesses are provided.

Referring to FIG. 6A, same shows that if the first recess 24 is not provided on the outer contour 28 of the rotor 20, that is, the part between the dotted line in the figure and the outer contour 28 is also provided with a rotor iron core, the magnetic field of the stator will flow through the rotor iron core as indicated by the arrows in the figure.

Figure 6B:
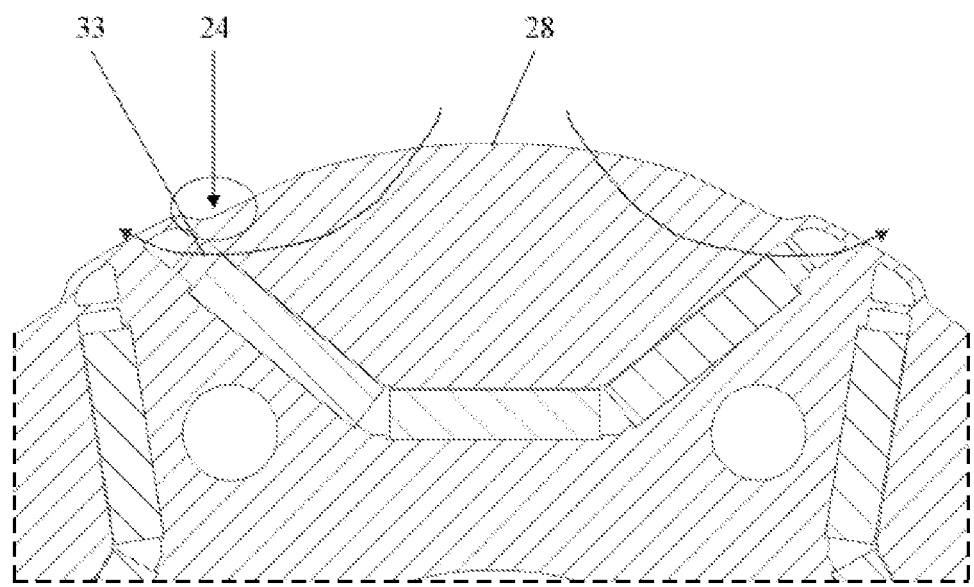

In contrast, referring to FIG. 6B, same shows the case where the first recess 24 is provided on the outer contour 28 of the rotor 20, and in this case, due to the non-magnetic conductivity of the first recess 24 and the existence of the second air slot 33, the magnetic field of the stator does not flow through the permanent magnets 30.

By comparing the simulation figure of the mechanical strength of the rotor without the second magnetic isolation bridge and the simulation figure of the mechanical strength of the rotor with the second magnetic isolation bridge, it can be seen that, under the same conditions, the mechanical strength of the rotor is calculated for a single punched piece, and the influence of centrifugal force on the rotor strength is observed (assuming that the stress-strain curve of the material changes linearly). It can be seen that the equivalent stress without the second magnetic isolation bridge is 837 Mpa, and the equivalent stress with the second magnetic isolation bridge is 235 Mpa, so the design of rotor with the second magnetic bridge has greatly reduced local stress, especially near the first recess.

Figure 7C:
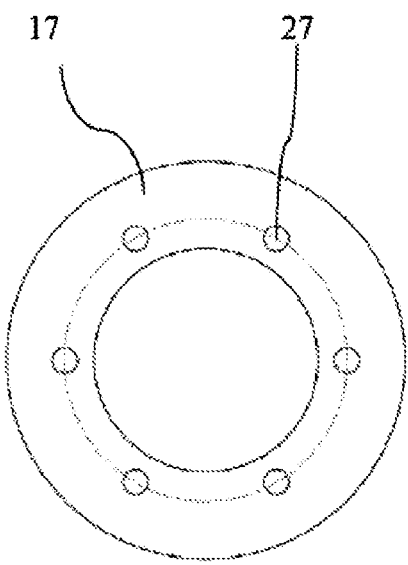
FIG. 7C is an enlarged view of that enclosed in the dashed box of FIG. 7B.
Figure 7C:
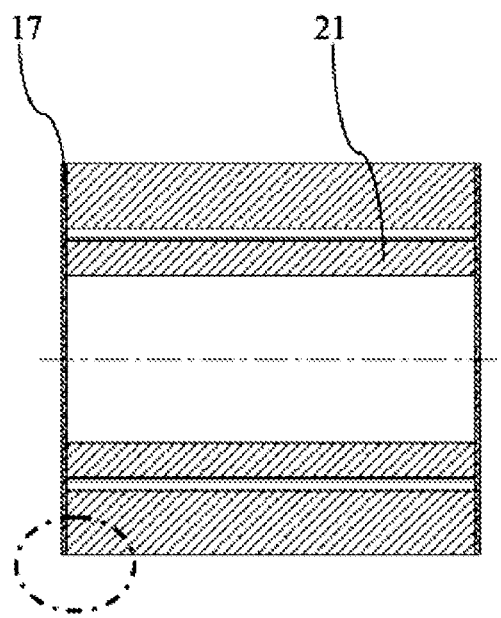
Figure 7C:
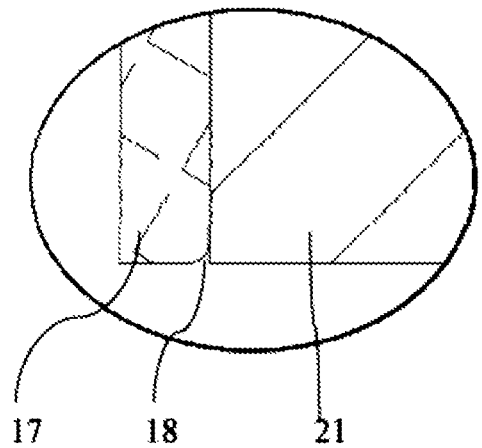

In addition, referring to FIG. 7A to FIG. 7C, same shows a modification of the rotor according to another embodiment, wherein, the rotor not only includes the above-mentioned rotor iron core 21, a plurality of U-shaped permanent-magnet accommodating grooves 22, a plurality of first air slots 23 and a plurality of first recesses 24, but also includes rotor covers 17 arranged on both sides of the rotor iron core 21 (see the left and right sides in FIG. 8B). The rotor cover 17 is made of a non-magnetic conductive material, and the outline of the rotor cover is circular with a diameter the same as the maximum outer diameter of the rotor 20.

Setting the diameter of the rotor cover 17 to be the same as the maximum outer diameter of the rotor 20 can prevent the rotor iron core 21 from being knocked and damaged when the rotor 20 is magnetized and then installed inside the stator, and at this time, the rotor cover 17 having a diameter the same as the maximum outer diameter of the rotor 20 can act as a protection.

Referring to FIG. 7C, at least one of the rotor covers 17 includes at least one chamfer 18 on the outer contour of the surface facing the rotor iron core 21. The chamfer 18 can be used to prevent the side edge of the rotor cover 17 near the rotor iron core 21 from scratching a testing tool when the testing tool is pulled out after checking the size of the air gap of the stator and the rotor. Therefore, in the application of the scroll compressor, since the testing of the air gap size is performed only from one side, the chamfer 18 can be provided only on one rotor cover 17 on one of the two sides of the rotor iron core 21.

As known to those skilled in the art, a compressor often needs an electric motor to provide power. The built-in permanent magnet motor of the present invention can be used in any compressor known in the art or in a future compressor. Usually, the working voltage of a compressor is a low to medium voltage of smaller than or equal to 600 V.

Although some embodiments of the general concept of the present invention have been shown and described, those of ordinary skill in the art will understand that changes may be made to these embodiments without departing from the principle and spirit of the general concept of the present invention, and scope of the present invention is defined by the claims and their equivalents.

The invention claimed is:

1. A rotor of an interior permanent magnet motor, the rotor comprising:
   a rotor core;
   a plurality of U-shaped permanent-magnet accommodating grooves, arranged at intervals inside the rotor core;
   a plurality of first air slots, arranged on the outside of an end of the U-shaped permanent-magnet accommodating grooves, each of the first air slots being located on an extension line of the end of a corresponding U-shaped permanent-magnet accommodating groove and being close to the outer contour of the rotor to form a plurality of first magnetic isolation bridges; and
   a plurality of first recesses, each of the first recesses being receded from the outer contour of the rotor toward the center of the rotor, starting from the end of the outermost corresponding first magnetic isolation bridge of the rotor and extending at most to a first point of intersection where a connecting line between the bottom center of the U-shaped permanent-magnet accommodating groove and the rotor center intersects with the outer contour of the rotor, such that the air gap flux density generated between the outer contour of the rotor and the inner contour of the stator of the interior permanent magnet motor is close to a sine curve;
   wherein a second magnetic isolation bridge is formed between each of the first air slots and the corresponding end of each of the U-shaped permanent-magnet accommodating grooves, extension lines on both sides of the second magnetic isolation bridge respectively intersect with the outer contour of the rotor to form two points of intersection, and the lowest point of the first recess corresponding to the second magnetic isolation bridge is located between the two points of intersection or coincident with one of the two points of intersection.

2. The rotor of an interior permanent magnet motor as claimed in claim 1, wherein
   the point of intersection where an extension line of the center line of the corresponding second magnetic isolation bridge intersects with the outer contour of the rotor is closer to the central axis passing through the first point of intersection than the lowest point of the corresponding first recess.

3. The rotor of an interior permanent magnet motor as claimed in claim 1, wherein
   the rotor further includes a plurality of groups of permanent magnets therein, each group of permanent magnets is accommodated in a corresponding U-shaped permanent-magnet accommodating groove, and each of the U-shaped permanent-magnet accommodating grooves includes a transverse extension groove and two vertical extension grooves communicating with the transverse extension groove.

4. The rotor of an interior permanent magnet motor as claimed in claim 3, wherein
   each of the vertical extension grooves is provided with a first protrusion at one end close to the second magnetic isolation bridge, and the first protrusion is used to limit the position of the permanent magnet in the U-shaped permanent-magnet accommodating groove, so that a second air slot is formed between the second magnetic isolation bridge and the permanent magnet, and the second air slot has a dimension h1 in the protruding direction of the first protrusion that is smaller than the dimension hm of the permanent magnet and is greater than or equal to ½ of the dimension hm of the permanent magnet.

5. The rotor of an interior permanent magnet motor as claimed in claim 4, wherein
   the junction between each vertical extension groove and transverse extension groove is provided with a cavity portion with a conical cross-section, and two connected second protrusions protruding toward the apex of the cone are arranged on the bottom of the cavity portion, and the top of the cavity portion is a circular arc-shaped second recess.

6. The rotor of an interior permanent magnet motor as claimed in claim 5, wherein
   the radius of the second recess is less than or equal to the height of the second protrusion protruding toward the second recess; or
   the sum of the radius of the second recess and the gap between the permanent magnet and the corresponding U-shaped permanent-magnet accommodating groove is equal to the height of the second protrusion protruding toward the second recess.

7. The rotor of an interior permanent magnet motor as claimed in claim 3, wherein
   the plurality of groups of permanent magnets are six groups, and each group is composed of 3n permanent magnets, wherein n is the number of blocks divided in an axial direction, and n is an integer greater than or equal to 1 and less than or equal to 8.

8. The rotor of an interior permanent magnet motor as claimed in claim 1, wherein
   an air gap between the inner contour of the stator and the outer contour of the rotor is, as a whole, an annular air gap; and
   the first air slot is an irregular or regular polygon-shaped permanent-magnet slot gap provided on the outside of each end of the U-shaped permanent-magnet accommodating groove.

9. The rotor of an interior permanent magnet motor as claimed in claim 1, wherein
   the rotor iron core has a cylindrical shape and is composed of a plurality of stacked silicon steel sheets, and the rotor iron core also includes a rotating shaft arranged at the center thereof.

10. The rotor of an interior permanent magnet motor as claimed in claim 1, wherein
    both sides of the rotor iron core are provided with rotor covers, the rotor covers are made of a non-magnetic conductive material, the rotor cover has a circular outline with a diameter the same as the maximum outer diameter of the rotor.

11. The rotor of an interior permanent magnet motor as claimed in claim 10, wherein
    at least one of the rotor covers includes at least one chamfer on an outer contour of a surface facing the rotor core.

12. A built-in permanent magnet motor, the interior permanent magnet motor comprising:
    a stator, the stator comprising a cylindrical stator iron core, a plurality of stator teeth extending inwardly in a stator radial direction, stator slots distributed among the plurality of stator teeth, and coils winding around the stator teeth to generate a rotating magnetic field; and
    the rotor as claimed in claim 1, the rotor being rotatably disposed in the stator and spaced apart from the stator.

13. The built-in permanent magnet motor as claimed in claim 12, wherein the stator iron core is formed by splicing a plurality of I-shaped teeth in a circumferential direction.

14. The built-in permanent magnet motor as claimed in claim 13, wherein an inner edge of the I-shaped tooth is a circular arc segment with the circle center being at the center of the stator, and the stator slot formed after splicing is a semi-closed slot with a slot opening greater than or equal to 3.5 mm.

15. The built-in permanent magnet motor as claimed in claim 13, wherein the tooth tip of the I-shaped tooth that is away from the rotation direction is a chamfered structure.

16. The built-in permanent magnet motor as claimed in claim 13, wherein the tooth tip of the I-shaped tooth on the forward side in the rotation direction of the rotor is a chamfered structure.

17. The built-in permanent magnet motor as claimed in claim 13, wherein the tooth tip of the I-shaped tooth on the forward side in the rotation direction of the rotor is an open hole structure.

18. A compressor, the compressor using the interior permanent magnet motor as claimed in claim 12, wherein the working voltage of the compressor is a voltage less than or equal to 600 V.

19. A rotor of an interior permanent magnet motor, the rotor comprising:
 a rotor core;
 a plurality of U-shaped permanent-magnet accommodating grooves, arranged at intervals inside the rotor core;
 a plurality of first air slots, arranged on the outside of an end of the U-shaped permanent-magnet accommodating grooves, each of the first air slots being located on an extension line of the end of a corresponding U-shaped permanent-magnet accommodating groove and being close to the outer contour of the rotor to form a plurality of first magnetic isolation bridges; and
 a plurality of first recesses, each of the first recesses being receded from the outer contour of the rotor toward the center of the rotor, starting from the end of the outermost corresponding first magnetic isolation bridge of the rotor and extending at most to a first point of intersection where a connecting line between the bottom center of the U-shaped permanent-magnet accommodating groove and the rotor center intersects with the outer contour of the rotor, such that the air gap flux density generated between the outer contour of the rotor and the inner contour of the stator of the interior permanent magnet motor is close to a sine curve;
wherein the rotor further includes a plurality of groups of permanent magnets therein, each group of permanent magnets is accommodated in a corresponding U-shaped permanent-magnet accommodating groove, and each of the U-shaped permanent-magnet accommodating grooves includes a transverse extension groove and two vertical extension grooves communicating with the transverse extension groove; and
wherein each of the vertical extension grooves is provided with a first protrusion at one end close to a second magnetic isolation bridge, and the first protrusion is used to limit the position of the permanent magnet in the U-shaped permanent-magnet accommodating groove, so that a second air slot is formed between the second magnetic isolation bridge and the permanent magnet, and the second air slot has a dimension h1 in the protruding direction of the first protrusion that is smaller than the dimension hm of the permanent magnet and is greater than or equal to ½ of the dimension hm of the permanent magnet.

\* \* \* \* \*